United States Patent

[11] 3,586,247

[72] Inventor Lyle Eugene Perrins
 St. Albans, England
[21] Appl. No. 727,733
[22] Filed May 8, 1968
[45] Patented June 22, 1971
[73] Assignee Imperial Chemical Industries, Limited
 London, England
[32] Priority May 12, 1967
[33] Great Britain
[31] 22186/67

[54] DISPERSION OF PIGMENTS IN NORMALLY SOLID CARRIER MEDIA
6 Claims, No Drawings

[52] U.S. Cl. .................................................. 241/16,
 106/308, 106/309
[51] Int. Cl. ........................................................ B02c 19/12
[50] Field of Search ........................................... 106/308 Q,
 309; 241/16

[56] References Cited
UNITED STATES PATENTS

| | | | |
|---|---|---|---|
| 2,225,146 | 12/1940 | Bechtold | 241/16 X |
| 2,844,486 | 7/1958 | Lamar | 241/16 X |
| 3,238,049 | 3/1966 | Somers | 241/16 X |
| 3,313,491 | 4/1967 | Lucchini | 241/16 |
| 3,460,767 | 8/1969 | Sonsthagen | 241/16 |

Primary Examiner—Donald G. Kelly
Attorney—Cushman, Darby and Cushman

ABSTRACT: Grinding a mixture of pigment and a carrier for the pigment at a temperature above the melting point of the carrier which is normally solid at room temperature. The dispersed product of such process is particularly suited for use in coloring plastic since the carrier acts both as an agglomeration preventing agent and to release discrete particles of pigment when added to the plastic.

DISPERSION OF PIGMENTS IN NORMALLY SOLID CARRIER MEDIA

The present invention relates to the production of easily dispersible pigment compositions suitable for use in coloring plastic materials. In the coloring of plastic materials, it is essential that the pigment should be well distributed throughout the plastic material; thus the pigment particles should be small and should not tend to agglomerate when they are compounded with the plastic material.

It is known to produce masterbatches and compound for coloring plastic materials by hot compounding a pigment and a plastic material. This process suffers from the disadvantages that the colors tend to fly, thus making the operation dirty; furthermore using this technique it is difficult to obtain an intimate mixture of coloring materials and polymer.

It has further been proposed that coloring materials may be obtained by mixing a dispersion of a pigment with stabilized aqueous emulsified polyolefine, coagulating the mixture and drying the coagulum to obtain the coloring material. This coagulation process, although producing improved compositions suffers from the disadvantage that an emulsified polyolefine must be used; it is more difficult and expensive to obtain an emulsified polyolefine than one that is not emulsified. It has been proposed that the disadvantage of using stable emulsified polyolefines can be overcome by mixing a water immiscible solution of a low molecular weight polyolefine with an aqueous pigment dispersion in the presence of a surfactant subsequently converting the surfactant to a water immiscible form to cause transfer of the pigment to the olefine solution phase and then removing the solvent. This process involves several steps and is thus costly and time consuming.

Throughout this specification the term "pigment" is used to describe the untreated material which is the actual source of the color and "pigment composition" to describe the readily dispersible coloring material obtained by the process of this invention.

According to the present invention we provide a process for the preparation of pigment compositions which comprises grinding a mixture of a pigment and a carrier for the pigment in the absence of water or solvent at a temperature above the melting point of the carrier which is normally solid at room temperature, and subsequently cooling the mixture.

By "grinding" we mean a process in which the mixture of the pigment and the molten polymer is subjected to impact as well as shear. For example, the grinding device may comprise a mill in which grinding elements, such as small beads are agitated by means of a stirrer. By this technique the mixture is continually bombarded due to the motion of the beads and also subjected to shear by the mixture being squeezed between the beads or between the beads and the stirrer.

The pigment employed in the process of the present invention should be a dry, preferably powdered, pigment and may be an organic or an inorganic pigment. The pigment should be compatible with the carrier and should not be degraded at the melting temperature of the carrier.

The pigment compositions prepared by the process of the present invention are particularly suitable for use in coloring plastic materials and the carrier material serves a dual purpose, firstly to surround the pigment particles thus preventing them from agglomerating and maintaining their particle size as low as possible; secondly to release the small, discrete particles in the plastic material when the pigment composition is compounded therewith. Thus, by "carrier for the pigment" we mean a substance which will envelope the pigment particles during the grinding process of our invention and will release them when compounded with the bulk plastic. In preparing a composition for use with a particular plastic material it is necessary that the carrier should be readily dispersible or soluble in the plastic material so that the pigment particles are released when the pigment composition is incorporated into the plastic material. Furthermore, the carrier should not have a deleterious effect on the physical properties of the plastic material. For example, it should not affect the color or electrical properties of the plastic material. The choice of carrier material will therefore depend upon the nature of the bulk plastic material which is to be colored, although many carriers will be suitable for use with more than one plastic material, for example, if the pigment composition is to be used to color a polyolefine such as polyethylene or a vinyl chloride polymer a low molecular weight polyethylene wax will be a suitable carrier.

The carrier material should be solid at room temperature and should preferably melt to give a liquid with a viscosity below 200, more preferably below 100 poises at 200° C. Examples of suitable low melting carriers include polyethylenes having a molecular weight in the range 1500 to 3000, polyethylene glycol, atactic polypropylene, rosin and polymerized rosin, rosin esters, magnesium stearate. However, if higher temperatures are used higher melting carriers may be used; examples of these higher melting carriers include the wide variety of polyterpene resins.

At any particular temperature the degree of grinding required to obtain a good pigment dispersion in the molten carrier phase depends upon the viscosity of the molten carrier phase; if necessary a suitable nonvolatile additive may be included in our process to reduce the viscosity of the molten carrier. The purpose served by the carrier is to separate the pigment particles from each other and thus prevent agglomeration; there will, therefore, be a maximum proportion of pigment that the pigment compositions of this invention can tolerate; compositions containing more than this maximum proportion may form a dilatent mixture with the carrier. Such factors as pigment particle size, porosity, size distribution and density control the maximum proportion of pigment that may be used. However, we have found that it is not possible to obtain useful pigment compositions containing more than 80 percent by weight of pigment. In other words, the compositions of the invention must contain not less than 20 percent by weight of the carrier.

The pigment compositions prepared by our invention may be used for coloring most plastic materials; the method of incorporating the pigment composition into the bulk plastic will depend on the nature of both the carrier and the bulk plastic. Suitable techniques for compounding include using conventional mixers, a twin roll mill or compounding in an extruder. Alternatively, the pigment composition may be tumbled with the plastic material until a uniform mixture is obtained and the resulting mixture then used in the usual plastic fabrication techniques.

Other insoluble additives may be ground with the pigment carrier mixture, for example stabilizers such as tribasic lead sulfate or finely divided filler materials such as calcium carbonate or silica may be incorporated in the mixture if desired.

The present invention is illustrated but in no way limited by reference to the accompanying examples.

EXAMPLES

Various carrier materials were melted in a 3 inches diameter bead mill fitted with a heating jacket. The rotor of the mill was started and the charge of 3 mm. beads slowly added. When the bead addition was complete, the rotor running at 1860 r.p.m. and the correct milling temperature reached, dry pigment was added. The temperature of the mix was controlled by reducing the heat supplied to the jacket and if necessary cooling. After 30 minutes grinding the mill was stopped and the product separated from the beads. Details of the preparations obtained are given in Table 1, "the Polymon Blue LBS referred to therein being a blue phthalocyanine pigment."

TABLE 1

| Example | Carrier material | Parts by weight | Pigment Name | Pigment Parts by weight | 3 mm. beads, parts by weight | Milling temperature, °C. |
|---|---|---|---|---|---|---|
| 1 | Low molecular wieght polyethylene | 120 | Polymon Blue LBS | 30 | 450 | 160 |
| 2 | Rosin ester | 222.5 | do | 75 | 350 | 160 |
| 3 | Polyterpene resin | 230 | do | 64 | 350 | 190 |
| 4 | Hydrogenated polyterpene resin | 150 | do | 37.5 | 350 | 190–200 |

The products obtained in these examples were evaluated by milling each with polyethylene for 5 minutes at 120° C. and also with the following polyvinyl chloride composition at 160° C.: Corvic H65/34–100 parts, dioctyl phthalate–30 parts, Mellite 31–30 parts. In all the evaluations enough of the pigment composition was used so that the final composition contained 0.4 part of actual pigment; all parts are by weight. Samples of the crêpes obtained from the above millings were squashed out to a thin layer on a microscope slide at 200° C. and the dispersion of the pigment throughout the sample was compared with a control sample prepared by compounding untreated Polymon Blue LBS with the polymers.

Generally in all but the sample using the control, except when the product of Example 4 was compounded with polyethylene, the majority of the pigment particles were so small that they were invisible to the human eye although a few particles could be seen. An assessment of the size distribution of the pigment particles which could be seen is given in Table 2 showing that the pigments are better dispersed if a pigment composition prepared by the process of this invention is used rather than an untreated pigment.

TABLE 2

| Product of Example No. | Size distribution in polyethylene | Size distribution in polyvinyl chloride |
|---|---|---|
| 1 | Substantially all the particles smaller than 6μ. | Substantially all the particles smaller than 9μ. |
| 2 | Substantially all the particles smaller than 6μ. | Substantially all the particles smaller than 9μ. |
| 3 | The majority of the visible particles were smaller than 3μ. | Substantially all the particles smaller than 9μ. |
| 4 | Many particles between 6 and 20μ and some as big as 50μ. | Substantially all the particles smaller than 9μ. |
| Control | A large number of visible particles having sizes between 6 and 12μ. | A large number of visible particles having sizes between 9μ and 20μ. |

I claim:
1. A process for the preparation of pigment compositions which comprises grinding a mixture of a pigment and a carrier for the pigment at a temperature above the melting point of the carrier which is normally solid at room temperature, said grinding being carried out in the absence of any liquid other than the molten carrier, and subsequently cooling the mixture, the carrier comprising at least 20 percent by weight of the mixture of pigment and carrier.

2. A process according to claim 1 in which the grinding is carried out in a bead mill.

3. A process according to claim 1 in which the carrier melts to give a liquid having a viscosity below 200 poises at 200° C.

4. A process according to claim 1 in which the carrier comprises polyethylene having a molecular weight in the range 1500 to 3000.

5. A process according to claim 1 in which the carrier comprises a member of the group consisting of rosin, polymerized rosin and rosin esters.

6. A process according to claim 1 in which a stabilizer is also ground with the mixture of the pigment and carrier.